Jan. 17, 1961   L. BURGARDT ET AL   2,968,557
PHOTOGRAPHIC FILTER LAYER
Filed Nov. 23, 1956
INVENTORS:
LOTHAR BURGARDT, OTTMAR WAHL.
BY
*Connolly and Hutz*
*Their* ATTORNEYS

United States Patent Office 2,968,557
Patented Jan. 17, 1961

2,968,557

PHOTOGRAPHIC FILTER LAYER

Lothar Burgardt, Leverkusen-Bayerwerk, and Ottmar Wahl, Opladen, Germany, assignors to Agfa Aktiengesellschaft Filed Nov. 23, 1956, Ser. No. 624,123

Claims priority, application Germany Dec. 23, 1955

11 Claims. (Cl. 96—84)

The present invention relates to photographic filter and antihalation layers.

In order to avoid the halation due to reflection on the backs of miniature and cinematograph film materials, it is known to apply layers of primarily alkali-soluble natural or synthetic resins which are dyed with dyestuffs. Such resins, which are applied from organic solvents, and which readily dissolve during the developing process owing to their alkali solubility, are described for example in United States Patents 1,954,377, 2,075,145, 2,077,789, 2,089,764, 2,131,747, 2,282,890.

A large number of standards are set as regards the dyestuffs necessary for dyeing the resin layers. The position of the absorption zone can differ depending on the spectral sensitivity of the material; it is also necessary for the dyestuff to have good solubility in the organic solvents from which the resin is applied, and for the dyestuff to be decolorized and the bleached compounds to dissolve readily in the alkali developer solutions, in order to avoid dyeing or contamination of the photographic baths. Furthermore, the dyestuffs should not have any deleterious effect on the physical properties of the resin layers, and should not transfer to the emulsion layer when in contact with the latter or be partially decolorized when kept in contact. It has now been found that styryl-like dyestuffs obtained by condensation of an indole which is unsubstituted in position β to the nitrogen atom and an aromatic or heterocyclic aldehyde which is capable of reacting with organic compounds containing active methylene groups to form styryl dyestuffs meet these requirements. The styryl-like dyestuffs of the present invention are characterized in that an indole residue has the carbon atom which stands in β-position to the nitrogen atom bonded by a double linkage to the carbon atom of an unsubstituted methine group which in turn is connected to a radical selected from the group consisting of radicals containing a heterocyclic nucleus having at least one nitrogen atom, and aromatic, especially benzene nuclei, which contain a substituted amino group preferably in p-position to the carbon atom which is bound to the methine group, said amino group being for instance substituted by one or two radicals selected from the group consisting of substituted and unsubstituted aliphatic and aromatic radicals.

The styryl-like structure referred to above results from the conjugate double bond chain of carbon atoms between the nitrogen of the indole and the nitrogen of the aromatic or heterocyclic aldehyde residue.

Suitable dyestuffs are for instance compounds of the following general formula:

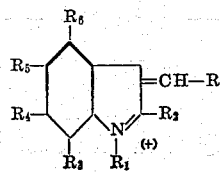

In this formula:

R represents an aromatic nucleus with a substituted amino group preferably in the p-position, or a heterocyclic ring system containing at least one nitrogen atom. As regards the first mentioned type of substituents benzene nuclei are preferred which contain in p-position an amino group which is substituted by one or two aliphatic or aromatic radicals, such as methyl, ethyl, propyl, butyl, alkyl groups substituted by carboxyl or hydroxy groups, such as carboxymethyl, carboxyethyl, ethoxy groups esterified carboxyl groups;

$R_1$ represents a hydrogen atom or a substituted or unsubstituted alkyl radical. Suitable substituents for the alkyl group are for instance halogen atoms, carboxyl groups, substituted carboxyl groups, preferably esterified carboxyl groups, such as carboxyl groups esterified with aliphatic and cycloaliphatic alcohols, hydroxy groups;

$R_2$ represents an alkyl, aryl, carboxyl or substituted carboxyl group, preferably an esterified carboxyl group, such as a carboxyl group esterified with an aliphatic or cycloaliphatic alcohol or a carbonamide group;

$R_3$, $R_4$, $R_5$ and $R_6$ represent hydrogen atoms, alkyl radicals, halogen atoms or two of the atoms that constitute part of an isocyclic, preferably an aromatic ring. Representative examples of such radicals are for instance methyl and ethyl groups and chlorine or bromine atoms.

These dyestuffs can be conveniently obtained by the condensation of indole or naphthindole derivatives with aromatic or heterocyclic aldehydes containing nitrogen. That amino group of the aldehyde component which is in the p-position can be connected through an aryl radical which in turn carries an aldehyde group to a second indole radical, so that symmetrical dyestuffs are formed. Such dyestuffs correspond to the general formula:

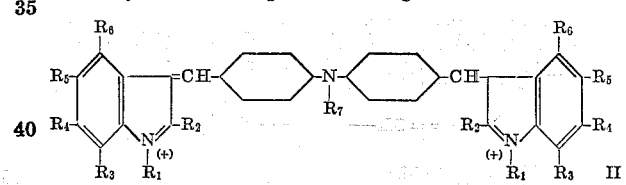

In this formula the substituents $R_1$, $R_2$, $R_3$, $R_4$, $R_5$, $R_6$ have the same meaning as in the Formula I, whereas $R_7$ stands for hydrogen or an organic residue such as an alkyl group as for instance methyl, ethyl, propyl, butyl.

In order to produce alkali solubility, the dyestuff molecule may carry one or more carboxyl groups. These can be localised in the indole component, in the aldehyde component or in both components. They may be bound for instance to the nitrogen atom of the heterocyclic rings or to the nitrogen atom of the aromatic aldehyde by way of alkylene groups such as ethylene, propylene or butylene groups. Moreover, the carboxyl groups may be linked directly to the aromatic or heterocyclic nuclei.

Depending on the choice of the two components selected for the production of the dyestuff, it is possible to obtain dyes with most varied absorption ranges comprising the entire visible part of the spectrum and the adjoining infra-red part thereof. It is another advantage of these dyestuffs that they have a high grey content when they are of suitable constitution. It is thus possible to include the desired section of the spectrum with one or two dyestuffs and to produce a very effective antihalation effect.

The dyestuffs in accordance with the invention are preferably produced by briefly heating the indole with the aldehyde in glacial acetic acid on a water bath in the presence of phosphorus oxychloride.

Examples of indole derivatives which are suitable for production of the dyestuffs referred to are: 2-methyl indole, 2-methyl indole-N-propionitrile, 2-methyl-indole-N-propionic acid, 2-phenylindole-N-propionic acid, indole-2-carboxylic acid, 1,2-dimethyl indole, 2-methyl-α-naphthindole-N-propionic acid and 1,2-dimethyl-β-naphthindole, 2-phenyl-indole-N-propionitrile, 2-phenyl-indole, 2-phenyl-indole-N-propionic acid ethyl ester, 1-ethyl-2-methyl-α-naphthindole, indole-2-carboxylic acid methyl ester, 5-chloro-2-methyl indole, 5-chloro-1,2-dimethyl indole, 2,5-dimethyl indole, 1-methyl-indole-2-carboxylic acid.

Examples of suitable aldehydes are: p-(N-methyl-N-carboxymethyl) - aminobenzaldehyde, p - (dicarboxymethyl) - aminobenzaldehyde, 6 - formyl - tetrahydroquinoline - N - acetic acid, hydroxyindole - 3 - aldehyde, α-pyrrole-aldehyde, indole-β-aldehyde, indole-3-aldehyde-2-carboxylic acid, carbazole-3-aldehyde-N-propionic acid, p - (dihydroxyethyl) - aminobenzaldehyde, p - p' - diformyl-N-ethyl diphenylamine, p-dimethylaminobenzaldehyde, 3 - methyl - 4 - N - methyl - N - carboxy - methylaminobenzaldehyde, p - N - methyl - N - ω - carbethoxy - methylaminobenzaldehyde, p,p' - diformyldiphenylamine. In all these heterocyclic rings, there are from 4 to 5 carbon atoms in addition to the nitrogen atom.

The dyestuffs are dissolved in organic solvents which are compatible with the solutions of the resin element to be applied or are directly added to the resin solutions. The dyed resin solutions are applied in the usual manner and dried. It is also possible to incorporate the dyestuffs into gelatine layers or into layers containing other forming colloids.

Those dyestuffs in accordance with the invention which are soluble in methylene chloride can also be used for dyeing the initial film material, for example for producing grey base or blue base films.

The following examples further illustrate the invention.

*Example 1*

30 g. of an alkali-soluble copolymer of vinyl butyl ether and maleic acid anhydride, and 15 g. of a dyestuff of the following constitution:

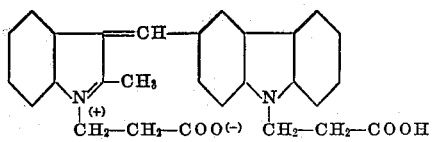

are dissolved in 1.5 litres of alcohol. After the solution has been applied to the backside of a photographic film support and dried, there is obtained a grey-violet antihalation layer the absorption of which extends over the entire visible range of the spectrum with the maximum effect in the green. Owing to the alkali solubility of the binder, the layer dissolves in ordinary alkaline silver halide developing solution, the dyestuff being at the same time decolourised.

The dyestuff is prepared in the following manner: 20.3 g. of α-methyl-indole-N-propionic acid (prepared according to German Patent 641,597 by reacting α-methyl indole with acrylonitrile and subsequent saponification) and 26.7 g. of carbazole-3-aldehyde-N-propionic acid, are heated in 200 cc. of glacial acetic acid after adding 15.5 g. of phosphorus oxychloride, the heating taking place for half an hour on a water bath. The solution, which has a deep colour, is introduced into water, and the dyestuff is filtered off with suction, dissolved in glacial acetic acid and reprecipitated with water. Melting point >300° C.

Carbazole-3-aldehyde-N-propionic acid is obtained in the following manner:

Carbazole is reacted with acrylonitrile in accordance with the process described in German patent specification 641,597 to provide the N-propionitrile and the latter is saponified by boiling with methanolic potassium hydroxide. The methyl ester is recovered from the carboxylic acid in the usual manner with methanolic hydrochloric acid and has a melting point of 55–56° C. The conversion to aldehyde can be smoothly carried out by the Vilsmeier process with formyl methyl aniline and phosphorus oxychloride. The aldehyde carboxylic acid ester is saponified at 30° C. with N sodium hydroxide solution. After being dissolved in and recrystallised from glacial acetic acid, the aldehyde carboxylic acid has a melting point of 195–196° C.

*Example 2*

Instead of using the dyestuff referred to in Example 1, it is also possible to use a dyestuff of the following constitution:

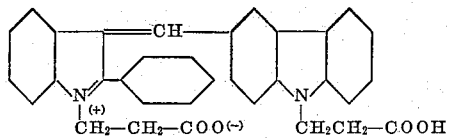

The resin backing layer is blue-grey and absorbs in the entire visible range of the spectrum with a maximum effect at approximately 600 mμ. The dyestuff is obtained analogously to the dyestuff described in Example 1 by using 26.5 g. of α-phenyl indole-N-propionic acid. The preparation of this latter substance is described in German patent specification 641,597.

The dyestuff is obtained as in Example 1 by condensation of 26.5 g. of α-phenylindole-N-propionic acid and 26.7 g. of carbazole-3-aldehyde-N-propionic acid in 200 cc. of glacial acetic acid in the presence of 15.5 g. of phosphorus oxychloride.

Melting point >300° C.

*Example 3*

10 g. of a dyestuff having the following constitution:

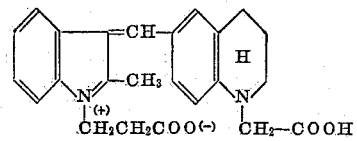

are dissolved in 2 litres of a 4% alcoholic solution of the alkali-soluble condensation product of phenoxyacetic acid and p-cresol dialcohol. The solution is applied in known manner as a backing layer. The layer is dyed violet and absorbs mainly blue and green light. The dyestuff is prepared analogously to the dyestuff described in Example 1.

1,2,3,4-tetrahydroquinoline-6-aldehyde-N-acetic acid is obtained in the following manner:

1,2,3,4-tetrahydroquinoline is reacted with ethyl chloracetate as described in Annalen, volume 318, page 113. The aldehyde group can be introduced in the usual manner by the Vilsmeier process. The ester is saponified at 40° C. with N sodium hydroxide solution and the carboxylic acid is dissolved in and recrystallised from glacial acetic acid. Melting point 186–188° C.

The dyestuff is obtained as in Example 1 by condensation of 20.4 g. of α-methylindole-N-propionic acid and 22 g. of 1,2,3,4-tetrahydroquinoline-6-aldehyde-N-acetic acid in 200 ccm. of glacial acetic acid in the presence of 15.5 g. of phosphorus oxychloride.

Melting point >300° C.

*Example 4*

Instead of the dyestuff referred to in Example 3, it is possible to use a dyestuff having the following constitution:

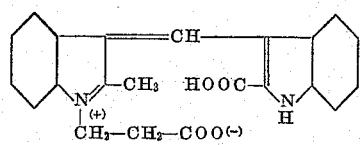

This dyestuff gives an orange-coloured backing layer, which absorbs blue and green light in about the same proportions.

The dyestuff is produced analogously to the dyestuff described in Example 1.

Indole-3-aldehyde-2-carboxylic acid is prepared by the method described in J. Am. Chem. Soc., volume 68 (1946), 1156.

The dyestuff is obtained as in Example 1 by condensation of 20.4 g. of α-methylindole-N-propionic acid and 18 g. of indole-3-aldehyde-2-carboxylic acid in 200 ccm. of glacial acetic acid in the presence of 15.5 g. of phosphorus oxychloride.

Melting point >300° C.

Example 5

15 g. of a dyestuff having the following constitution are dissolved in 1.5 litres of a 2% ethanolic solution of an alkali-soluble copolymer of vinylethyl ether and maleic acid anhydride and is cast in the usual manner as an antihalation layer. The layer is greyish red in colour.

The dyestuff is prepared analogously to the dyestuff described in Example 1.

p-(N-methyl-N-carboxymethyl amino)-benzaldehyde is obtained from N-methyl-N-carboxymethyl aniline by the Vilsmeier process and subsequent saponification. Dissolved in and recrystallised from glacial acetic acid, the aldehyde has a melting point of 199–201° C.

The dyestuff is obtained as in Example 1 by condensation of 19.4 g. of α-phenylindole and 19.4 g. of p-(N-methyl-N-carboxymethylamino)-benzaldehyde in 200 ccm. of glacial acetic acid and adding 15.5 g. phosphorus oxychloride.

Melting point 140–143° C.

Example 6

Instead of the dyestuff in Example 5, it is possible to use a dyestuff having the following constitution:

It yields a blue antihalation layer, which extends into the long-wave infra-red range.

p-(Dicarboxymethyl)-aminobenzaldehyde can be prepared from aniline-N-diacetic acid (Jour. Amer. Chem. Soc., volume 87, page 438) by conversion into the methyl ester (B.P.$_{14}$ 204–206° C.) with methanol and sulphuric acid, Vilsmeier synthesis and saponificaiton in 2 N sodium hydroxide solution at 30 C. When dissolved in and recrystallised from glacial acetic acid, the aldehyde melts at 203–205° C.

The dyestuff is obtained as in Example 1 by condensation of 13.4 g. of 1,2-dimethyl-α-naphthindole and 15.8 g. of p-(dicarboxydimethylamino)-benzaldehyde in 140 ccm. glacial acetic acid in the presence of 10.4 g. of phosphorus oxychloride.

Melting point >300° C.

Example 7

An anthihalation layer the efficiency of which extends over the entire sensitivity range of a panchromatic film is obtained in the following manner:

5–10 g. of a dyestuff of the following constitution are dissolved in 1.5 litres of a 3% alcoholic solution of the alkali-soluble condensation product of phenoxyacetic acid and formaldehyde.

The solution is applied in the usual manner to the back of the support and dried. The layer is greyish-violet in colour and has an absorbing effect in the entire visible range and also in the adjoining infra-red and ultra-violet ranges.

The dyestuff is prepared analogously to the dyestuff described in Example 1 from 1 mol of the dialdehyde in 2 mols of the indole derivative.

p,p′-Diformyl-N-ethyl diphenylamine is obtained as follows:

240 g. of phosphorus oxychloride and 150 g. of dimethyl formamide are mixed while cooling.

After one hour, 100 g. of N-ethyl diphenylamine are added dropwise to the mixture while stirring, the mixture is stirred for 4 hours at 80° C. and introduced at 40° C. into dilute hydrochloric acid.

After stirring for several hours, the oil becomes solid; the aldehyde is filtered off with suction and dissolved in and recrystallised from alcohol.

M.P.=73–74° C.

The dyestuff is obtained as in Example 1 by condensation of 26.6 g. of α-phenylindole-N-propionic acid and 12.6 g. of p,p′-diformyl-N-ethyldiphenylamine in 180 cc. of glacial acetic acid in the presence of 15.5 g. of phosphorus oxychloride.

Melting point >300° C.

Example 8

The dyestuff of the following formula is used according to the prescription of Example 1 to produce a red violet antihalation layer. The dyestuff is obtained as in Example 1 by condensation of 13.1 g. of α-methylindole and 26.7 g. of carbazole-3-aldehyde-N-propionic acid in 200 ccm. glacial acetic acid in the presence of 15.5 g. of phosphorus oxychloride.

Melting point >300° C.

Example 9

The dyestuff of the formula is used to produce an orange anti-halation layer according to the prescription given in Example 1. The dyestuff is obtained as in Example 1 by condensation of 10.6 g. of α-phenylindole-N-propionic acid and 6.5 g. of oxindole aldehyde in 80 ccm. of glacial acetic acid in the presence of 6.2 g. of phosphorus oxychloride.

Melting point=108–112° C.

Example 10

The dyestuff of the formula

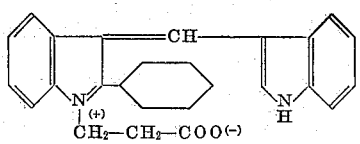

is used to produce a grey red anti-halation layer according to the prescription given in Example 1.

The dyestuff is obtained as in Example 1 by condensation of 10.6 g. of α-phenylindole-N-propionic acid and 5.8 g. of β-indolealdehyde in 80 ccm. glacial acetic acid in the presence of 6.2 g. of phosphorus oxychloride.

Melting point = 192–196° C.

Example 11

The dyestuff of the formula

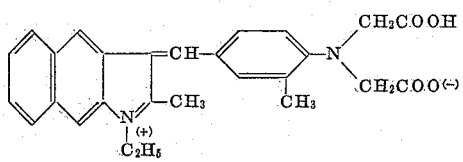

is used to produce a grey blue anti-halation layer according to the prescription given in the Example 1.

The dyestuff is obtained as follows: 15 g. of 1-ethyl-2-methyl-β-naphthindole and 18.4 g. of m-methyl-p-(N-dicarbethoxymethylamino)-benzaldehyde are condensed in 140 ccm. of glacial acetic acid in the presence of 10.4 g. of phosphorus oxychloride and isolated as in Example 1. The raw dyestuff is boiled for a short time in a 5% caustic soda solution until a clear solution is obtained. This solution is treated with active carbon and precipitated with hydrochloric acid. The saponified product is filtered with suction and washed with water.

Melting point >300° C.

We claim:

1. A photographic light sensitive material comprising in combination a support, a light sensitive silver halide emulsion layer on said support, said support also carrying a light absorbing layer of an indole dyestuff having the formula:

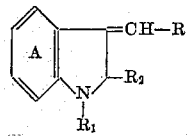

wherein R is a member having a nitrogen atom connected by a conjugate double bond chain of carbon atoms to the nitrogen of the indole moiety, said member being selected from the group consisting of amino-aryl radicals and radicals containing a cyclic nitrogen atom in a heterocyclic ring also having from 4 to 5 carbon atoms, $R_1$ is a member of the group consisting of hydrogen, alkyl, alkyl substituted by a carboxyl group, alkyl substituted by a nitrile group and alkyl substituted by an esterified carboxyl group, $R_2$ is a member of the group consisting of alkyl, aryl, carboxyl, esterified carboxyl, and the benzene nucleus A of the indole radical is selected from the group consisting of an unsubstituted benzene nucleus, a benzene nucleus substituted by an alkyl, a benzene nucleus substituted by a halogen atom and a benzene nucleus condensed with a further benzene ring.

2. The photographic light sensitive material of claim 1, wherein the dyestuff contains a carboxyl group.

3. The photographic light sensitive material of claim 1, wherein the radical R of said dyestuff corresponds to the formula:

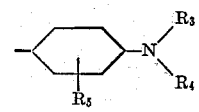

wherein $R_3$ and $R_4$ stand for members of the group consisting of alkyl, alkyl substituted by carboxyl, alkyl substituted by esterified carboxyl, alkyl substituted by hydroxyl, and $R_5$ stands for alkyl.

4. A photographic light sensitive material according to claim 3, wherein the dyestuff corresponds to the formula:

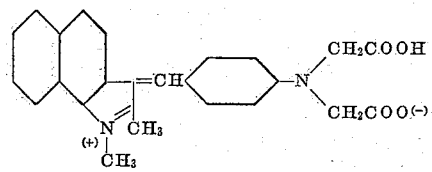

5. The photographic light sensitive material of claim 1, wherein the radical R of said dyestuff is selected from the group consisting of a tetrahydroquinolyl radical connected in the 6 position, an indolyl radical connected in the 3 position, a carbazolyl radical connected in the 3 position, and an alpha pyrrolyl radical.

6. The photographic light sensitive material of claim 1, wherein the radical R of said dyestuff is selected from the group consisting of an N-carboxyalkyl tetrahydroquinolyl radical connected in the 6 position, an indolyl radical connected in the 3 position and substituted in the 2-position by a radical selected from the group consisting of hydroxyl and carboxyl radicals, and an N-carboxyalkyl carbazolyl radical connected in the 3 position.

7. A photographic light sensitive material according to claim 1 wherein the dyestuff corresponds to the formula:

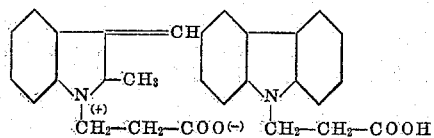

8. A photographic light sensitive material according to claim 1 wherein the dyestuff corresponds to the formula:

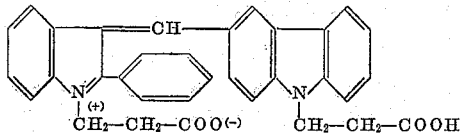

9. A photographic light sensitive material according to claim 1 wherein the dyestuff corresponds to the formula:

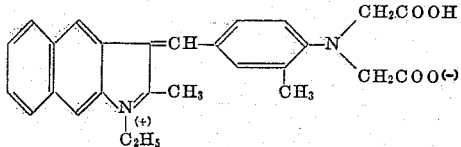

10. A photographic light sensitive material comprising in combination a support, a light sensitive silver halide emulsion layer on said support, said support also carrying a light absorbing layer of a dyestuff having the formula:

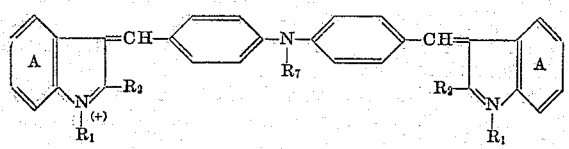

wherein $R_1$ is a member of the group consisting of hydrogen, alkyl, alkyl substituted by a carboxyl group, alkyl substituted by a nitrile group and alkyl substituted by an esterified carboxyl group, $R_2$ is a member of the group consisting of alkyl, aryl, carboxyl, esterified carboxyl, the benzene nucleus A of the indole radical is selected from the group consisting of an unsubstituted benzene nucleus, a benzene nucleus substituted by an alkyl, a benzene nucleus substituted by a halogen atom and a benzene nucleus condensed with a further benzene ring and $R_7$ stands for a member of the group consisting of hydrogen and alkyl.

11. A photographic light sensitive material according to claim 10, wherein the dyestuff corresponds to the formula:

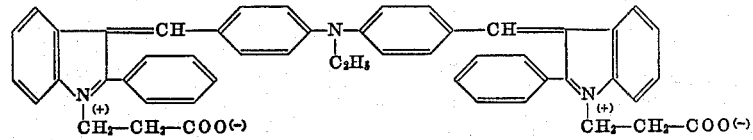

References Cited in the file of this patent

UNITED STATES PATENTS

| | | |
|---|---|---|
| 2,298,731 | Brooker et al. | Oct. 13, 1942 |
| 2,622,980 | Copeland | Dec. 23, 1952 |

OTHER REFERENCES

Mees: The Theory of the Photographic Process, MacMillan Co., N.Y., 1942, pages 991, 992, 1034.